INVENTOR.
ROGER TANGUAY
BY
ATTORNEYS

May 31, 1966  R. TANGUAY  3,254,145
METHOD AND APPARATUS FOR TIPPING LACES
Filed Feb. 4, 1963  4 Sheets-Sheet 4

INVENTOR.
ROGER TANGUAY
BY *Salter + Michaelson*
ATTORNEYS

United States Patent Office 3,254,145
Patented May 31, 1966

3,254,145
METHOD AND APPARATUS FOR TIPPING LACES
Roger Tanguay, Pawtucket, R.I., assignor to Lincoln Lace & Braid Company, Providence, R.I., a corporation of Rhode Island
Filed Feb. 4, 1963, Ser. No. 255,872
6 Claims. (Cl. 264—157)

This invention relates generally to a method and apparatus for tipping laces and is more particularly concerned with the tipping of laces constructed of a thermoplastic material.

A primary object of this invention is the provision of a novel and improved method and apparatus for tipping thermoplastic shoelaces and the like wherein the tip is formed as an integral part of the lace per se and does not require utilization of any additional material or ingredient.

The art of tipping shoelaces and the like is an old and well-known one, and automatic machinery has long been in use for effecting this purpose. However, all of the prior art in this field teaches techniques and apparatus whereby a separate element of some sort, either metallic or plastic, is applied to the lace to provide the tip therefor. The more recent techniques tend to deviate from the old and well-known metallic tip by utilizing a plastic material in the form of a celluloid strip or the like, said material being applied to the lace at the desired location and then integrated therewith, usually by heat and pressure. United States Patents 2,233,121 and 2,740,156 are illustrative of this general idea.

Although the above described prior art methods and techniques have generally proven to be satisfactory, whether the tips are metallic or plastic, the fact remains that the method and apparatus employed are rendered somewhat more complex and expensive due to the fact that the tip is actually constructed of a material which is separate and distinct from that of the lace per se, since the apparatus and method must obviously have provisions for handling and introducing this separate element or material to the lace and, also, for integrating same therewith.

It is therefore a primary object of the invention to do away with the necessity of handling any separate material or ingredient by providing a tipping technique wherein the tip is actually formed from the lace itself. This has been made possible by the relatively recent developement of thermoplastic fibers which have been successfully used in the manufacture of shoelaces and the like. It will therefore be understood that the instant invention is specifically applicable only to laces which are constructed of a thermoplastic material, or any equivalent material having substantially the characteristics thereof, said characteristics basically being the ability to fuse and be molded under the proper heat and pressure conditions.

Although my invention is of primary value in connection with braided thermoplastic laces, since braided laces have the greatest tendency to fray, hence necessitating proper tipping, it will nevertheless be understood that this invention is also of value in connection with extruded thermoplastic laces.

It is therefore an object of my invention to provide a method and apparatus for tipping thermoplastic laces that are somewhat less complicated and expensive when compared to prior art techniques, since no additional material need be used for the tip per se.

It is also an important object of my invention to provide a method and apparatus for tipping thermoplastic laces wherein the tip has an attractive and highly finished appearance and wherein the tip is extremely rugged and durable and not subject to cracking or breakage such as frequently happens with presently existing tips.

A further object of my invention is the provision of a method and apparatus for tipping laces wherein the tip may easily assume any desired cross sectional configuration.

Other objects, features and advantages of the invention will become apparent as the description thereof proceeds when considered in connection with the accompanying illustrative drawings.

In the drawings which illustrate the best mode presently contemplated for carrying out the instant invention:

It has been found that where shoelaces and the like are constructed of a thermoplastic material it is possible to tip such laces by the application of sufficient heat and pressure whereupon a tip is actually formed by fusing and molding the lace per se, rather than by introducing an additional material, such as metal or plastic, to provide the tip. Where the thermoplastic lace is of the conventional braided construction, the tip formed in accordance with this invention performs the usual function of preventing fraying of the lace and at the same time facilitating threading of the lace through eyelets and the like. Where the thermoplastic lace is of an extruded construction, there is little likelihood of fraying, and hence tipping of the lace is not actually as important as where the lace is of a braided construction. However, even where the lace is of an extruded construction, it may be desirable to provide a tip thereon having a particular configuration which may facilitate threading of the lace, even though fraying is not a serious problem. In any event, tips provided in accordance with the method and apparatus of this invention have proven to be extremely durable and effective, and not subject to crackage or other deleterious effects which are a possibility with existing conventional tips.

Figure 1:
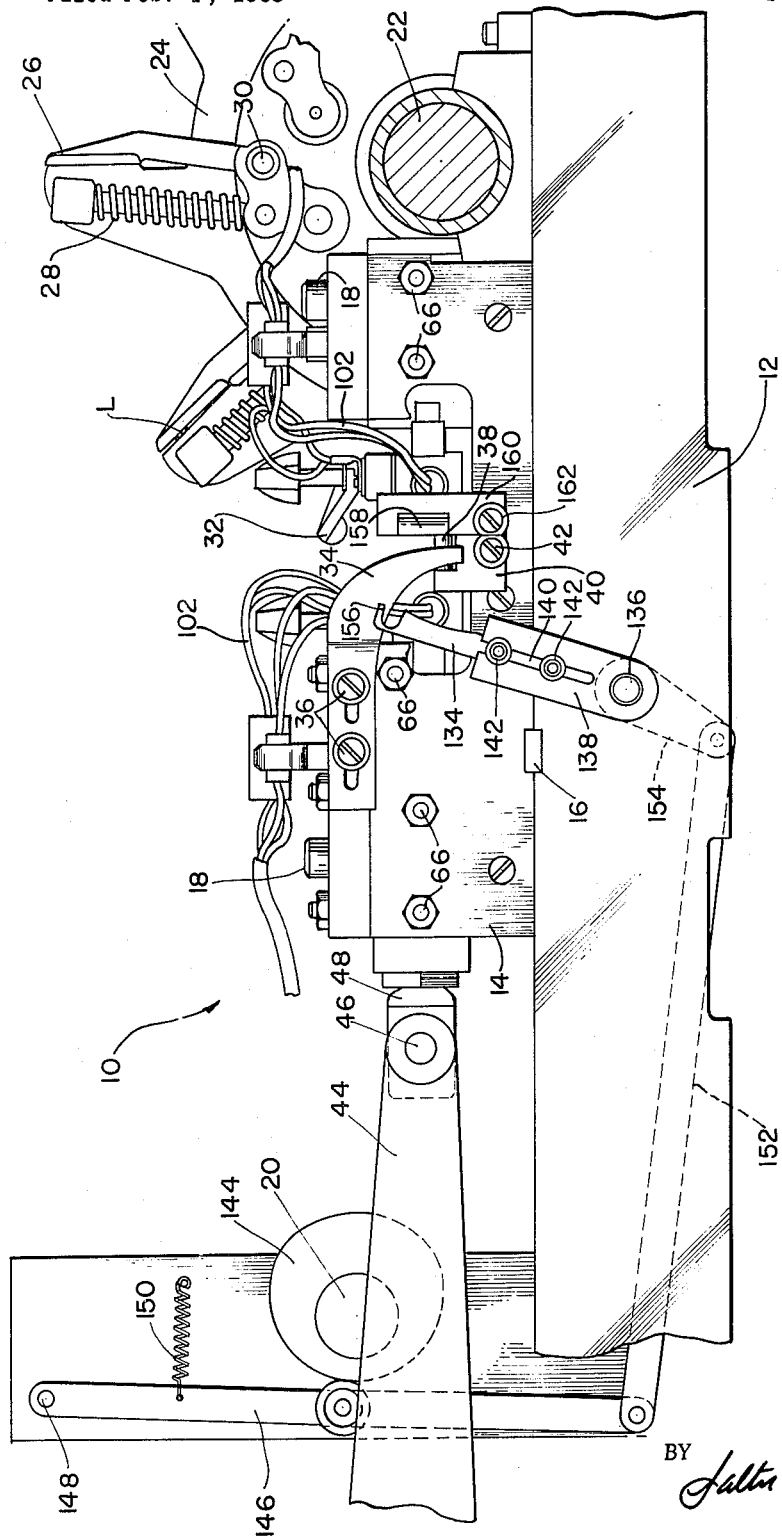
FIG. 1 is a fragmentary side elevational view of the apparatus which forms a part of my invention.

Referring now to the drawings and more particularly to FIG. 1 thereof, there is shown generally at 10 a lace tipping apparatus adapted to carry out the novel lace tipping method to be described. The apparatus 10 comprises a base 12 on which is rigidly mounted a die bed 14, said die bed being rigidly located with respect to base 12 by means of laterally extending keys 16 and being bolted in assembled relation by means of bolts 18 which extend downwardly from the top of the die bed into the said base. A main shaft 20 extends laterally of the apparatus 10 and is journalled by any suitable means (not shown) and is continuously driven by any suitable motor means or the like, also not shown.

Figure 2:
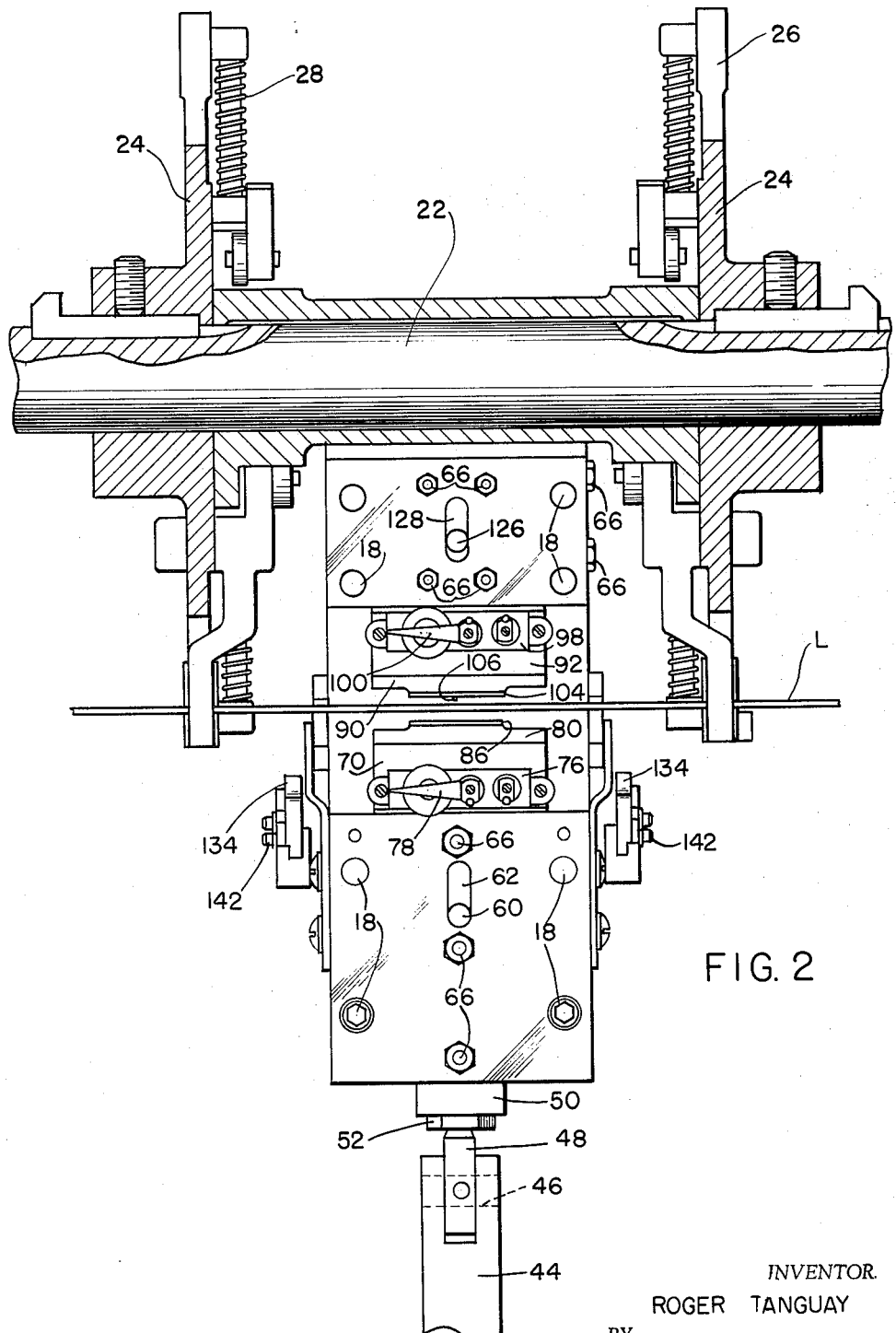
FIG. 2 is a top plan view thereof, partially broken away and in section for purposes of illustration.

Continuously driving main shaft 20 imparts intermittent rotary motion to feed shaft 22 by any suitable means, such as a Geneva, not shown. As will be seen most clearly in FIGS. 1 and 2, shaft 22 drivingly carries a pair of spaced spiders 24, each of which comprises a series of spaced radial clamping fingers 26, which fingers are adapted to resiliently receive and clamp the lace to be tipped and at the same time feed said lace to the tipping station. It is pointed out that the lace feed means forms no part of the instant invention but rather represents conventional structure that has long been used in lace tipping apparatus, as exemplified, for example, by the aforementioned U.S. Patent 2,233,121. Briefly, however, it will be noted that springs 28 function to urge the fingers 26 in a counterclockwise direction about pivot 30, when viewing FIG. 1, whereupon finger 26 is adapted to resiliently clamp the lace L against each of the spiders with the lace extending tautly across the apparatus, as most clearly illustrated in FIG. 2. It will be understood that the spider 24 is carrying a continuous length of lace, whereby each time a tipping operation is performed, and the tipped lace is severed at the midpoint of the formed tip, two tips are actually being simultaneously formed. One of the formed tips completes a lace, the other end of which has already been tipped, while the other tip becomes the first one to be formed on the next lace. Expressed differently, it is pointed out that at all times during operation of the apparatus there is a continuous length of lace being handled, said lace having a tip at its forward end. With each subsequent tipping operation, the desired length of lace is severed from the supply while at the same time the second tip is formed to complete the severed lace. Simultaneously, the first tip is being applied to the front end of the continuous length of lace still being handled by the apparatus. Conventional means are utilized for releasing the tipped and severed lace from clamping fingers 26 subsequent to the tipping operation, said means comprising a tripping finger 32 which functions to cam open the clamping finger 26 that is holding the completely tipped and severed lace.

As aforenoted, shaft 22 is intermittently rotated by drive shaft 20 in order to feed the lace L to the tipping station. As the shaft 22 and the spiders 24 rotate, the laterally extending lace L is carried down against a pair of arcuate guides 34, adjustably mounted on opposite sides of die bed 14, as by screws 36. The lace L is carried downwardly against the edges of the spaced guides 34 until the lace extends across a pair of spaced horizontally extending rollers 38. Shaft 22 will continue to rotate for a very slight additional distance and then will automatically stop, whereupon the lace L is now being tautly held in lateral relation at the die station, and, as will be most clearly seen in FIG. 3, the lace is positively located as a result of the spaced rollers 38 on which the lace is bottoming, and also as a result of the particular position of adjustment of the arcuate guides 34. As will be seen most clearly in FIG. 1, the rollers 38 are mounted at opposite sides of the die bed by means of plates 40 which are adjustably secured to the die bed as by screws 42. Thus, the particular positions of adjustment of the guides 34 and the rollers 38 will determine the precise positioning of the lace at the die station.

Figure 3:
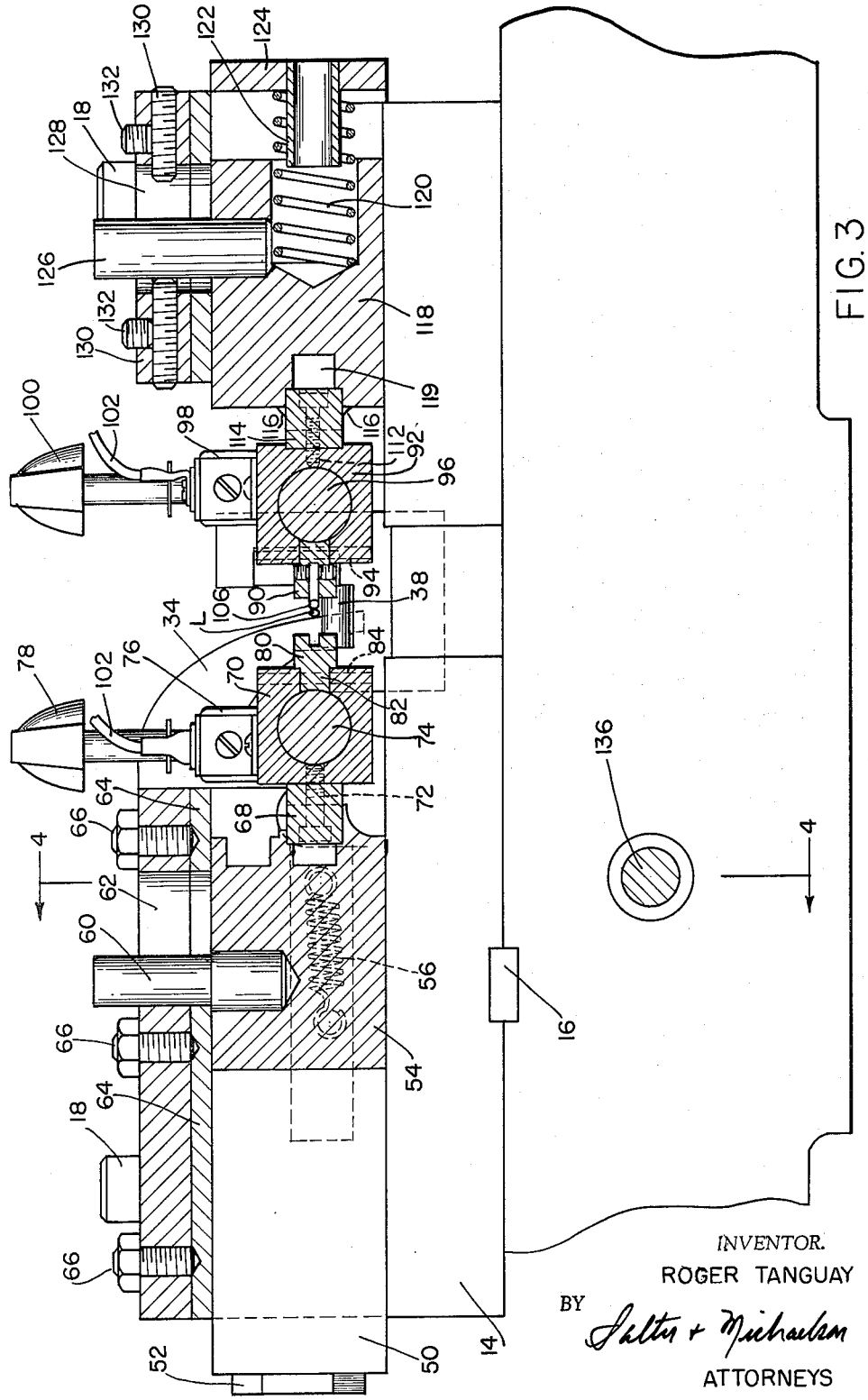
FIG. 3 is an enlarged side section.
Figure 4:
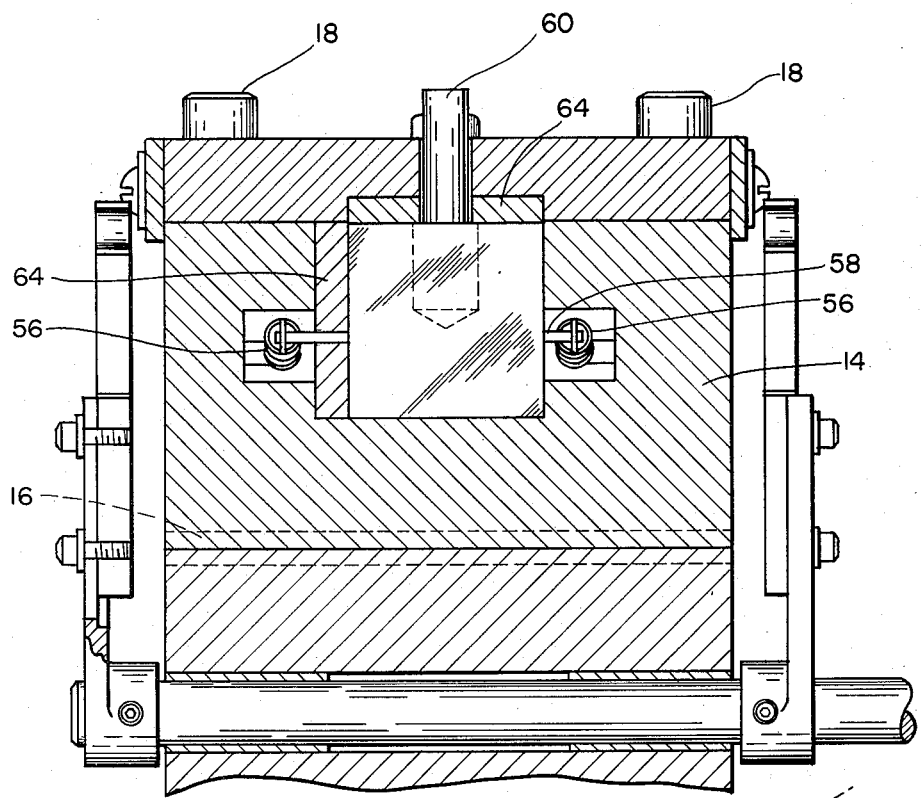
FIG. 4 is a section taken on line 4—4 of FIG. 3.

As soon as shaft 22 has carried the lace L to the tipping station, as aforedescribed, and said shaft ceases to rotate, the continuously driving main shaft 20 operates cam means, not shown, which impart reciprocal motion to arm 44. Arm 44 is connected by a cross stud 46 to a connecting pin 48 which in turn is threadedly connected to a plunger 50 by means of element 52. It will be understood that the purpose of this interconnection is simply to transmit reciprocal motion of arm 44 to plunger 50, and the threaded interconnection just described is merely a means for enabling an adjustment to be obtained with respect to the initial and final limits of the reciprocal stroke of plunger 50. As will be seen most clearly in FIG. 3, the plunger 50 extends into die bed 14 and is adapted to engage an inner plunger 54 for imparting reciprocal motion thereto. The inner plunger 54 is resiliently maintained in its rearmost position, as illustrated in FIG. 3, by means of springs 56 which engage a pin 58 extending laterally through the plunger 54 and which at the same time engage the fixed die bed 14. As will be seen most clearly in FIG. 4, spaces are provided in die bed 14 for housing the springs 56. A stud 60 is secured to the inner plunger 54 and extends upwardly therefrom through an elongated slot 62 provided in the upper portion of die bed 14. Stud 60 and slot 62 function to determine the limits of reciprocal movement of the inner plunger 54, it being obvious that springs 56 will normally maintain the plunger 54 in its rearmost position as determined by stud 60 and slot 62. Noting particularly FIGS. 3 and 4, it will be seen that gibs 64 are provided for enabling the sliding movement of plungers 50 and 54 to be controlled, it being noted that adjusting screws 66 are provided for enabling any desired amount of pressure to be applied to the plungers via the aforesaid gibs.

By having the plungers 50 and 54 as separate elements, a lost-motion connection is obtained between the two, thereby enabling a limited degree of movement of inner plunger 54 to be obtained for a much larger reciprocal stroke of arm 44 and plunger 50. In any event, when the plunger 50 makes engagement with inner plunger 54, it will commence to move the latter toward the right, when viewing FIG. 3. It will be noted that the plunger 54 carries at its forwardmost portion a block 68 which in turn is attached to a second block 70, as by screw 72. The block 70 has an opening therein for receiving a heating element 74, said heating element being controlled by a thermostat 76 and any suitable control knob 78. As shown most clearly in FIGS. 3 and 5, the block 70 has assembled thereto a female die 80, said die having a portion 82 which extends rearwardly into engagement with the heating element. Pins 84 function to assemble the die 80 to block 70, it being noted that the die 80 has at its outer face a pair of spaced ribs 86 slightly chamfered as at 88. Since the die 80 is in intimate contact with heating element 74, it follows that the die may be maintained at a desired degree of heat, as determined by thermostat 76 and control 78. It will further be noted that block 68 is connected to plunger 54 in a manner so as to maintain heat transfer to a minimum, thus maintaining the heating of die 80 at maximum efficiency. For the same reason, stud 60 and slot 62 cooperate to maintain the block 70 in slightly spaced relation from the adjacent edge of die bed 14 when the plunger 54 is in its rearwardmost position, as illustrated in FIG. 3.

Figure 5:
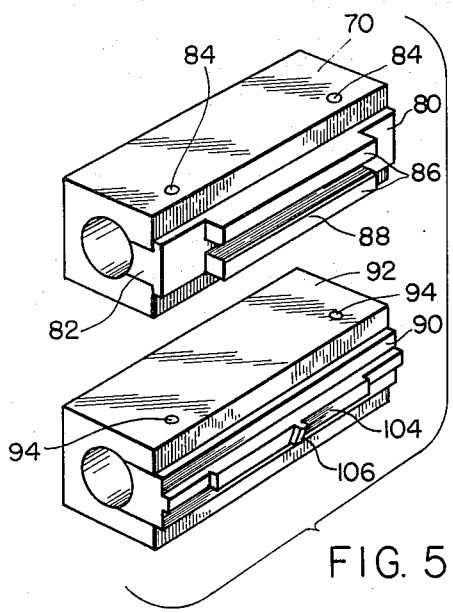
FIG. 5 is an enlarged perspective view of the die elements per se which form a part of my invention.

In opposed spaced relation to female die 80, there is mounted a male die 90 shown most clearly in FIGS. 3 and 5. Male die 90 is mounted to a block 92 by pins 94 in much the same manner as female die 80 is mounted to block 70. It will be noted that block 92 is provided with a bore therein for receiving a heating element 96 and that a suitable thermostat 98 and control knob 100 are provided for regulating the heat of element 96. It will be noted that die 90 extends rearwardly into contact with heating element 96 in order to insure maximum transmission of heat from the element 96 to the die 90. Reference character 102 in the drawings identifies the electrical wiring that is utilized in connection with the circuit that controls heating of the elements 74 and 96 and operation of their respective thermostats 76 and 98.

Figure 6:
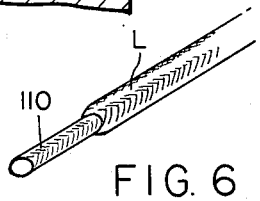
FIG. 6 is an enlarged perspective view illustrating one type of tip formed in accordance with my invention.
Figure 7:
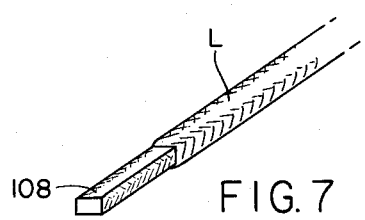
FIG. 7 is an enlarged perspective view showing another type of tip formed in accordance with my invention.

As will be seen most clearly in FIG. 5, male die 90 comprises a transversely extending rib 104 which has substantially at its center point an integral severing blade 106. As will be seen most clearly in FIG. 3, male die 90 and female die 80 are in alignment with each other, whereupon said dies are caused to close, as will hereinafter be described, the rib 104 and severing blade 106 will complement each other and will interengage to apply heat and pressure to the portion of lace located within said dies. It will be obvious that the dies shown in FIG. 5 are shaped to provide a substantially square or rectangular tip, as illustrated at 108 in FIG. 7. It will be obvious, however, that dies 80 and 90 may be designed to impart any desired cross sectional configuration to the tip being formed, such as, for example, a round configuration, as illustrated at 110 in FIG. 6.

Secured to the rear surface of block 92, as by screw means 112, is another block 114, said block 114 in turn being secured, as by welds 116, to a plunger 118 slidably mounted in the die bed 14. It will be noted that block 114 actually performs a comparable connecting function as that of the aforedescribed block 68, and in this connection it will be seen that a space 119 is provided between block 114 and plunger 118 so as to maintain heat transfer between these elements at a minimum. This insures maximum efficiency with respect to the heating of die 90 by heating element 96.

As will be seen most clearly in FIG. 3, plunger 118 is resiliently urged to the left or toward die 80 by means of spring 120, it being noted that said spring encircles a stud 122 carried by plate 124, it being understood that plate 124 is fixedly secured to the die bed 14. A stud 126 is fixedly secured to plunger 118 and extends upwardly therefrom, said stud extending through a slot 128, the limits of which are adjustably defined by adjustment screws 130. It will be obvious that by adjusting the screws 130 to any desired position, and then locking them in said position by means of set screws 132, the limits of the reciprocal stroke of plunger 118 are defined. It will be understood that suitable gibs and pressure screws are associated with plunger 118 to control its slidable movement in the same manner as aforedescribed in connection with plungers 50 and 54.

In summarizing the operation of the apparatus described up to this point, it will be understood that continuously rotating main shaft 20 causes intermittent rotation to be imparted to feed shaft 22. Rotation of feed shaft 22 causes rotary movement of spaced spiders 24, which in turn carry the lace to be tipped to the tipping station. More specifically, the lace extends tautly across the spaced spiders and is caused to move downwardly along the edges of spaced arcuate guides 34 until the lace is stretched across spaced horizontal rollers 38. At this moment, or just slightly thereafter, movement of shaft 22 and spiders 24 temporarily terminates, and at this point continuously moving shaft 20, through suitable cam means, causes arm 44 and plunger 50 connected thereto to initiate a reciprocal stroke. After a predetermined time and amount of movement, plunger 50 engages plunger 54 and commences movement of the plunger 54 to the right, when viewing FIG. 3, against the action of springs 56 which normally tend to urge the plunger 54 to the positon of rest illustrated in FIG. 3. As the plunger 54 is caused to initiate its stroke by means of its engagement by plunger 50, the heated female die 80, since it is connected to plunger 54, also commences movement. Since the die 80 is in alignment with the length of lace which is being held tautly over the spaced rollers 38, said lace will be engaged by the female die and will be carried along therewith, it being understood that the chamfered portion 88 on the leading inner edges of the ribs 86 facilitate positioning of the lace between the aforesaid ribs. As the female die 80 and the lace which has been engaged thereby continue to be moved to the right, when viewing FIG. 3, it will be seen that the male die 90 is soon engaged. More specifically, the heated male die 90, and particularly rib 104 and severing blade 106, will cooperate with female die 80 to apply heat and pressure to the portion of lace located therebetween. At the same time, severing blade 106 will sever the portion of the lace within the dies into two separate sections. Since the male die 90 is free for a limited degree of movement to the right against the action of spring 120, it will be seen that upon first engagement or closing of the female and male dies, the entire assembly will continue to move to the right until stud 126 engages the rear adjusting screw 130. When this happens, no further movement of plunger 118 is possible, and hence, further movement of plunger 54 will insure application of sufficient heat and pressure to the lace held within the closed dies. As a practical matter, stud 126 will engage the rear adjusting screw 130 just slightly before plunger 54 and hence die 80 have reached the end of their stroke, and hence there is only a limited degree of further relative movement between the dies 80 and 90 after movement of die 90 has terminated. The reason for spring mounting the male die 90 is that it has been found that a better forming and severing action is achieved where only a limited degree of pressure is first applied by the dies. Thus, in effect, the shock absorbing tendencies of spring 120 have proven to be highly effective and advantageous in resulting in the formation of a better formed tip and one which is more cleanly severed. It has been found that by regulating the heating elements to temperatures of approximately 525° to 550° F., best results are achieved, although it will be understood that the exact temperatures employed will be somewhat dependent on the fusion characteristics of the particular thermoplastic being used in the lace. The various adjustments heretofore illustrated and described, such as the adjustable interconnection between arm 44 and plunger 50, the adjustability of the spaced arcuate guides 34, as well as that of the horizontal rollers 38, and finally the adjustability of the stroke of plunger 118, are all important in enabling the apparatus to be properly set up for the particular size lace being tipped. Expressed differently, it is essential that the lace be properly aligned between the dies and that the proper pressure be applied to the lace by the opposed dies when in their fully closed position. All of these interrelations are obviously somewhat dependent on the cross sectional size of the lace being tipped, and hence the aforedescribed adjustments enable the apparatus to be readily and accurately adapted to different size laces.

It will be understood that as plunger 54 and female die 80 connected therewith complete their stroke to the right, when viewing FIG. 3, the portion of the lace which is located between the dies 80 and 90 is simultaneously compressed and heated to provide a cross sectional configuration determined by the configuration of the dies. Thus, where the dies are of substantially square configuration, a square tip similar to that illustrated at 108 in FIG. 7 will be formed, although it will be understood that different configuration tips can be achieved simply by utilizing dies of different design. The application of heat and pressure to the thermoplastic lace causes that portion of the lace to fuse and mold to the desired configuration, whereupon an integrated tip is formed that is incapable of breaking or unraveling. Actually, it will be understood that two tips are simultaneously being formed, since severing blade 106 is actually cutting the tip portion into two separate sections, and, as previously described, one of the tips forms the second tip of a now completed lace, while the other tip becomes the first one on a lace which will be completed and severed during the next subsequent tipping operation. It has been found that a slightly more effective severing operation is achieved where the severing blade 106 is positioned slightly on a bias, as illustrated in FIG. 5.

The final step of my method, and the corresponding apparatus which performs same, will now be described. At the moment plunger 54 and female die 80 have completed their stroke to the right, and with the dies 80 and 90 still in their completely closed position, means become effective for laterally pulling the tipped and severed laces from opposite sides of the closed dies. This particular step forms an important part of my invention, since it has been found that by pulling the tipped and severed laces laterally out from opposite sides of the completely closed dies, a wiping action is achieved on the tips which automatically smooths and polishes them. Conversely, it has been found that where the dies are opened before the tipped and severed laces are extracted, the tips do not have either a smooth or finished appearance, nor are they shaped as cleanly and accurately. In order to effect this particular operation, a pair of fingers 134 are provided at opposite sides of base 12 and are pivotally mounted to a finger shaft 136. More specifically, as will be seen most clearly in FIG. 1, the fingers 134 are adjustably mounted with respect to shaft 136 by means of element 138, slot 140 and securing screws 142. Shaft 136 is rocked at a predetermined time interval by means of cam 144 carried by the continuously rotating drive shaft 20. More specifically, at the moment arm 44 has completed its stroke to the right, cam 144 becomes effective to rotate lever 146 in a clockwise direction about its pivot point 148, against the action of spring 150. This movement of arm 146 causes shaft 136 to rotate in a clockwise direction through the medium of links 152 and 154. As the shaft 136 commences its clockwise rotation, it will be seen that finger 134 will likewise rotate in a clockwise direction since this finger is fixed to the finger shaft. The hook-like portion 156 adjacent the upper extremity of finger 134 will eventually engage the lace L at a point between the side surfaces of die bed 14 and the adjacent spiders 24, as will be seen most clearly in FIG. 2. This engagement, and subsequent rotation of the fingers 134, will force the severed lace portions to be extracted laterally from the closed dies, thereby automatically achieving the aforedescribed wiping and polishing action. The horizontal rollers 38, and also the vertical rollers 158, will function to reduce friction as the laces are being forced downwardly by fingers 134 and outwardly from the closed dies. As will be seen most clearly in FIG. 1, the vertical rollers 158 are mounted in position by means of plates 160 secured to the side surfaces of the die bed by means of screws 162. As soon as the laces have been pulled outwardly from opposite sides of the closed dies, the fingers 134 will automatically return to their inoperative position, as illustrated in FIG. 1, due to continued rotation of drive shaft 20 and cam 144. At the same time, arm 44 will start its return stroke, whereupon as soon as plunger 118 has returned to its normal position, as illustrated in FIG. 3, the dies will commence to open once again until plunger 54 has once again returned to the return position also illustrated in FIG. 3. As this happens, the Geneva (not shown) carried by shaft 20 again causes shaft 22 to commence rotating whereupon the next lace portion to be tipped is fed to the tipping station. The cycle of operation is then repeated.

While there is shown and described herein certain specific method steps and structure embodying the invention, it will be manifest to those skilled in the art that various modifications and rearrangements may be made without departing from the spirit and scope of the underlying inventive concept and that the same is not limited to the particular forms herein shown and described except insofar as indicated by the scope of the appended claims.

What is claimed is:

1. The method of tipping a thermoplastic lace comprising the following steps:
    (a) feeding said lace to a position of alignment between a pair of opposed dies,
    (b) moving said dies to a closed position so as to apply pressure to a portion of the lace,
    (c) heating said dies whereby the combination of heat and pressure causes the portion of the lace within said dies to fuse to a predetermined cross sectional configuration,
    (d) severing said fused lace portion intermediate its length while said portion is still in said closed dies, and
    (e) pulling the tipped laces laterally out from between the dies while the dies are still closed.

2. Apparatus for tipping thermoplastic laces comprising a pair of normally spaced opposed dies, means for heating said dies, means for moving said dies to a closed position wherein a thermoplastic lace held therebetween is fused and molded to a cross sectional configuration determined by said dies, one of said dies having a blade which severs said molded and fused lace portion when the dies are closed, and means for pulling the severed lace laterally out from opposite ends of the closed dies.

3. Apparatus for tipping thermoplastic laces comprising:
    (a) a base,
    (b) a die bed fixedly mounted on said base,
    (c) a pair of opposed, normally spaced male and female dies mounted on said die bed,
    (d) means for heating said dies,
    (e) means for feeding and holding a length of lace between said dies,
    (f) means for moving said female die toward said male die whereupon the portion of lace located therebetween is carried by the female die into engagement with the male die and compressed therebetween, said heat and pressure causing said lace portion to be fused and molded to a cross sectional configuration determined by said dies,
    (g) means for severing said fused and molded portion intermediate its length while the dies are still closed, and
    (h) means for pulling the severed lace laterally out from opposite ends of the closed dies.

4. The apparatus of claim 3 further characterized in that said severing means is a blade carried by said male die, whereupon when said dies close to form the tip, the latter is simultaneously severed.

5. The apparatus of claim 3 further characterized in that said male die is resiliently mounted for a limited degree of movement when engaged by said female die, said movement being just slightly less than the movement of said female die, thus insuring proper compression of the aforesaid lace portion during final movement of said female die.

6. The apparatus of claim 3 further characterized in that said pulling means comprise a pair of fingers, each of which engages the lace outside the ends of the closed dies, and cam means for actuating said fingers at a predetermined time interval.

References Cited by the Examiner

UNITED STATES PATENTS

| | | | |
|---|---|---|---|
| 1,888,429 | 11/1932 | Matson | 18—1 |
| 2,012,905 | 8/1935 | Chace | 18—1 |
| 2,074,670 | 3/1937 | Regar | 18—1 |
| 2,232,216 | 2/1941 | Daly | 264—157 |
| 2,290,935 | 7/1942 | Bacon | 264—157 |
| 2,702,555 | 2/1955 | DeMar | 264—80 |
| 2,702,556 | 2/1955 | DeMar | 264—80 |

FOREIGN PATENTS

| | | |
|---|---|---|
| 509,980 | 7/1939 | Great Britain. |
| 514,220 | 11/1939 | Great Britain. |

WILLIAM J. STEPHENSON, *Primary Examiner.*

ROBERT F. WHITE, *Examiner.*

S. A. HELLER, *Assistant Examiner.*